(12) United States Patent
Bellavista et al.

(10) Patent No.: US 10,542,134 B2
(45) Date of Patent: Jan. 21, 2020

(54) CALL FORWARDING DETECTION IN VOICE OVER PACKET INTERCEPTION

(71) Applicant: TELEFONAKTIEBOLAGET LM ERICSSON (PUBL), Stockholm (SE)

(72) Inventors: Tiziana Bellavista, Gaeta (IT); Giuseppe Fasolino, Baronissi (IT); Roberto Giglio, Salerno (IT); Antonio Giordano, Pellezzano (IT); Luca Marchesano, Castellammare di Stabia (IT); Arturo Orlandino, Torre del Greco (IT); Giovanna Spadaccio, Naples (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 66 days.

(21) Appl. No.: 15/502,840

(22) PCT Filed: Aug. 28, 2014

(86) PCT No.: PCT/IB2014/064128
§ 371 (c)(1),
(2) Date: Feb. 9, 2017

(87) PCT Pub. No.: WO2016/030723
PCT Pub. Date: Mar. 3, 2016

(65) Prior Publication Data
US 2017/0237852 A1    Aug. 17, 2017

Related U.S. Application Data

(60) Provisional application No. 62/042,513, filed on Aug. 27, 2014.

(51) Int. Cl.
*H04M 3/22* (2006.01)
*H04L 29/06* (2006.01)
*H04M 7/00* (2006.01)

(52) U.S. Cl.
CPC ........ *H04M 3/2281* (2013.01); *H04L 63/306* (2013.01); *H04L 65/1006* (2013.01); *H04L 65/1096* (2013.01); *H04M 7/006* (2013.01)

(58) Field of Classification Search
CPC .............. H04L 63/306; H04L 65/1006; H04L 65/1096; H04M 3/2281; H04M 7/006; H04W 12/02
See application file for complete search history.

(56) References Cited

U.S. PATENT DOCUMENTS 8,260,258 B1 * 9/2012 Li ......................... H04L 63/306
370/235
9,392,572 B2 * 7/2016 Naaman ................ H04W 4/025
(Continued)

FOREIGN PATENT DOCUMENTS

WO   2009103340 A1   8/2009

OTHER PUBLICATIONS

ETSI, "Lawful Interception (LI); Handover interface for the lawful interception of telecommunications traffic," ETSI TS 101 671 V3.9.1, Nov. 2011.
(Continued)

*Primary Examiner* — Ayaz R Sheikh
*Assistant Examiner* — Debebe A Asefa
(74) *Attorney, Agent, or Firm* — Patent Portfolio Builders PLLC

(57) ABSTRACT

A mechanism for maintaining the same communication identity number when intercepted calls are forwarded is embodied in various methods, devices and media-storing software.

18 Claims, 5 Drawing Sheets

(56) References Cited

U.S. PATENT DOCUMENTS

| | | | | |
|---|---|---|---|---|
| 2004/0181599 A1* | 9/2004 | Kreusch | ................. | H04L 43/00 |
| | | | | 709/227 |
| 2010/0233992 A1* | 9/2010 | Nooren | ................. | H04L 51/14 |
| | | | | 455/404.1 |
| 2013/0326224 A1* | 12/2013 | Yavuz | ................. | H04L 9/3247 |
| | | | | 713/176 |

OTHER PUBLICATIONS

ETSI, "Lawful Interception (LI); Handover interface for the lawful interception of telecommunications traffic," ETSI TS 671 V3.12.1, Oct. 2013.

ETSI, "Lawful Interception (LI); Handover Interface and Service-Specific Details (SSD) for IP delivery; Part 1: Handover specification for IP delivery," ETSI TS 102 232-1 V3.6.1, Feb. 2014.

ETSI, "Lawful Interception (LI); Handover Interface and Service-Specific Details (SSD) for IP delivery; Part 5: Service-specific details for IP Multimedia Services," ETSI TS 102 232-5 V3.2.1, Jun. 2012.

ETSI, "Lawful Interception (LI); Handover Interface and Service-Specific Details (SSD) for IP delivery; Part 5: Service-specific details for IP Multimedia Services," ETSI TS 102 232-5 V3.3.1, Jul. 2014.

3GPP, "3rd Generation Partnership Project; Technical Specification Group Services and System Aspects; 3G security; Handover interface for Lawful Interception (LI) (Release 11)," 3GPP TS 33.108 V11.2.0, Mar. 2012.

International Search Report and Written Opinion dated Jun. 24, 2015 in related International Application No. PCT/IB2014/064128.

\* cited by examiner

CALL FORWARDING DETECTION IN VOICE OVER PACKET INTERCEPTION

TECHNICAL FIELD

The present invention generally relates to networks, software and methods and, more particularly, to techniques for recognizing call forwarding by a network operator based on inspecting messages passed through the network.

BACKGROUND

A network operator may be required in certain instances to intercept and provide access to Content of Communications (CC) and Intercept Related Information (IRI) related to a target. For example, Law Enforcement Agencies (LEAs) may submit an intercept request (e.g., lawful authorization or warrant), which specifies at least the target, the type of intercept (i.e., IRI-only or IRI and CC), the authorized period of interception, and the address to which intercepted information is to be delivered. The request may include other interception parameters.

Upon receiving such a request, the network operator (in some documents named the communication service provider), intercepts and forwards the requested information in association with a Communication Identity Number (CIN) that uniquely identifies an intercepted communication session. Details of lawful interception are described in various standards, such as ETSI TS 102 232 related to "Lawful Interception (LI); Handover Interface and Service-Specific Details (SSD)" (more specific: version 3.2.1 of part 5 and version 3.6.1 of part 1) or ETSI TS 101 671, "Lawful Interception; Handover Interface for the lawful interception of telecommunication traffic" version 3.12.1.

Most existing handover interfaces use CIN. However, in networks providing voice over packet (VoP) services, maintaining a unique CIN becomes difficult because there are usually several nodes involved in signaling (e.g., SIP proxies). A Mediation Function (MF) tries to correlate different signaling messages coming from different nodes in order to use the same CIN for the same communication session. However, conventional algorithms are unable to maintain the same CIN for all results of the interception when call forwarding (e.g., Call Forwarding Unconditional, CFU, Call Forwarding on Busy, CFB, or Call Forwarding on No-Reply, CFNR) occurs during a session. The forwarded call is then treated as a new session with a new CIN.

Therefore, it is desirable for network operators to be able to relate an initial call and the redirected (i.e., forwarded) call to maintain the same CIN for a communication session during which forwarding occurs.

SUMMARY

An objective of various embodiments is to enable the network operator to provide required target-related information to an agent using the same CIN for a session when call forwarding occurs during the session. The agent is then able to analyze the information as a whole rather than connecting (or not) pieces received with different CINs (a new CIN being used if the network operator does not recognize the forwarded call as pertaining to a preexisting communication session).

According to an embodiment, there is a method performed by a network operator that sends to an agent required target-related information that communicates via the network managed by the network operator. The method includes intercepting first messages carrying first information which indicates that they are related to a first communication session. The method further includes sending a first CIN and the required information extracted from the first messages to the agent. The method then includes intercepting a second message transmitted after the first messages and carrying second information, which differs partially from the first information and indicates engaging the target, and determining whether the second message is related to the first communication session by comparing pieces of the first information with pieces of the second information. The method then includes sending the first CIN and the required information extracted from the second message to the agent, if it is determined that the second message is related to the first communication session.

According to another embodiment, there is an arrangement including a processor in a network operator configured to intercept messages transmitted to a target via a network managed by the network operator. The arrangement includes a first module configured to intercept first messages carrying first information indicating that the first messages are related to a first communication session engaging the target, and a second module configured to send a first CIN and the required information extracted from the first messages to an agent. The arrangement further includes a third module configured to intercept a second message transmitted after the first messages and carrying second information that partially differs from first information, and a fourth module configured to determine whether the second message is related to the first communication session by comparing pieces of the first information with pieces of the second information. The arrangement also includes a fifth module configured to send the first CIN and the required information extracted from the second message to the agent, if the fourth module determines that the second message is related to the first communication session.

According to yet another embodiment, there is a computer-readable medium configured to store executable codes, which, when executed by a computer in a network managed by a network operator, makes the computer perform a method for sending to an agent required information related to a target. The method includes intercepting first messages carrying first information which indicates that the first messages are related to a first communication session engaging the target, and sending a first CIN and the required information extracted from the first messages to the agent. The method further includes intercepting a second message transmitted after the first messages and carrying second information, which differs partially from the first information and indicates engaging the target, and determining whether the second message is related to the first communication session by comparing pieces of the first information with pieces of the second information. The method also includes, if determined that the second message is related to the first communication session, sending the first CIN and the required information extracted from the second message to the agent; otherwise, sending a second CIN, which is different from the first CIN, and the required information extracted from the second message to the agent.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a communication network configured to allow lawful interception of communications. However, it should be understood that the various embodiments achieve recognizing forwarded calls and may be applied for other tasks which would benefit from tracking communication sessions in spite of call forwarding.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments or claims.

In the context of a communication network that intermediates access between endpoints which may subscribe to different access networks, the network operator managing the communication network is configured to provide information related to communication sessions in which a target is one of the endpoints. For any session, the information is provided to an agent together with a communication identity number (CIN), which is uniquely associated with the session.

To avoid assigning more than one CIN when forwarding information related to the same communication session, a method according to an embodiment compares a later-received message carrying session-related information that partially differs from session information in earlier-received messages to determine whether the later-received message pertains to the same communication session as earlier-received messages.

Figure 1:
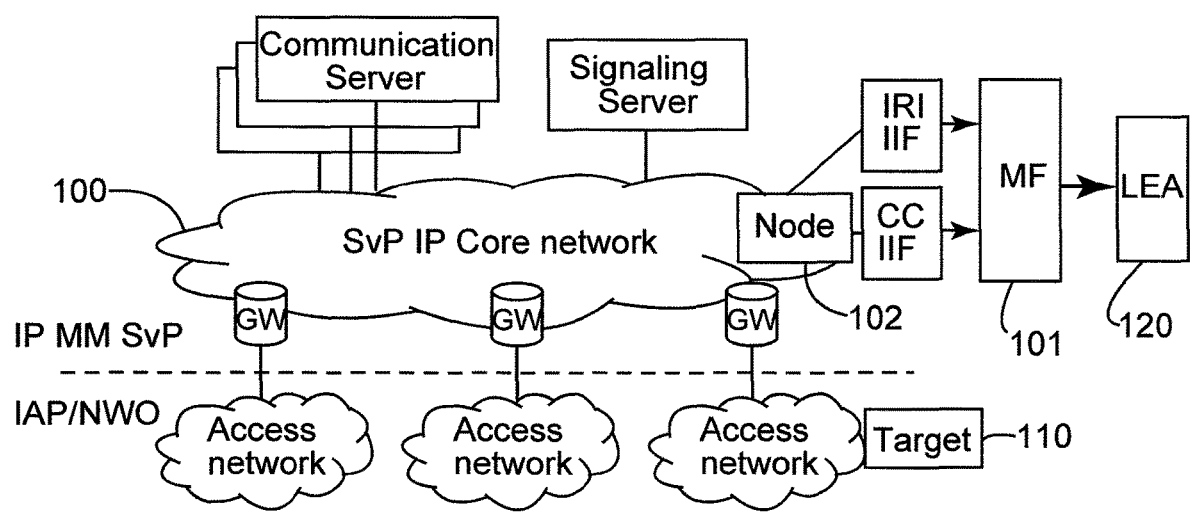
FIG. 1 illustrates a network according to an embodiment.

FIG. 1 illustrates a network according to an embodiment. This figure builds on FIG. 3, labeled "Network layer Interception Model" of ETSI TS 102 232-5 version 3.2.1 (description of the elements and inter-relationships therein are not repeated as being known to telecommunication engineers). Communication network 100 includes an arrangement, which may be a node or distributed, but including at least one data processing unit (i.e., processor). Arrangement 101 receives a copy of all signaling information (e.g., SIP messages, at least IRI but maybe also CC) which may be copied and directed to 101 by a node 102. Arrangement 101 then sends the information related to a target 110 that communicates via the network 100, to an agent 120.

Figure 2:
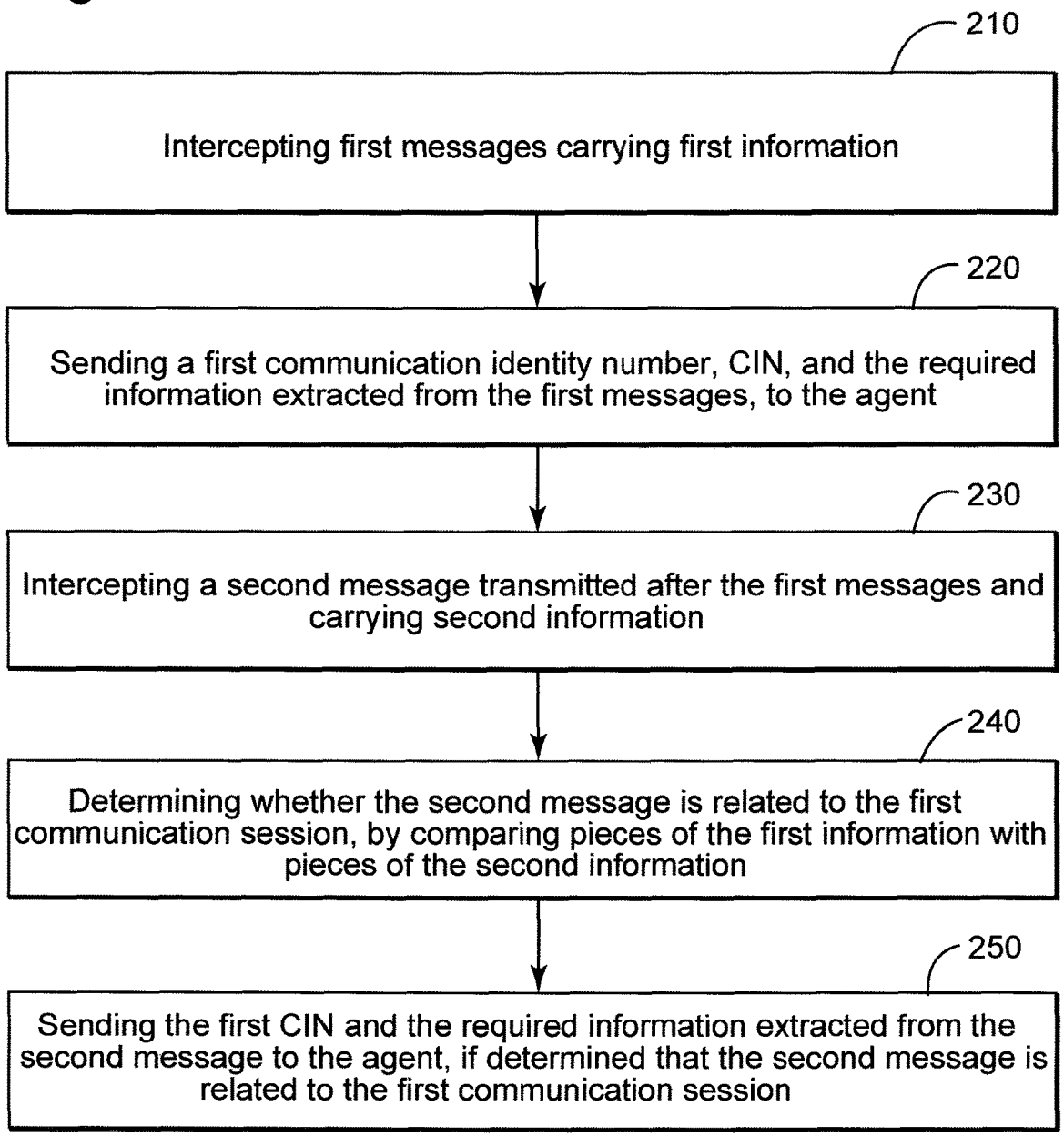
FIG. 2 is a flowchart of a method according to another embodiment.

A flowchart of a method according to an embodiment is illustrated in FIG. 2. The method includes intercepting first messages carrying first information which indicates that they are related to a communication session, at 210. For example, ETSI TS 102 232-5 version 3.2.1 describes an algorithm which correlates CIN with "Call_ID" and "SDP O" fields (which indicates the IP address of the message source) of a Session Initiation Protocol, SIP, message. Upon determining that the first messages pertain to the same communication session, a first communication identity number, CIN, and the required information extracted from the first messages is sent to agent 120, at 220.

Further, the method includes intercepting a second message transmitted after the first messages and carrying second information which differs partially from the first information, but still indicates engaging the target, at 230. For example, due to call forwarding (e.g., CFU, CFB or CFNR) both the "Call_ID" and the "SDP O" fields of a second SIP message differ from corresponding fields in the first SIP messages. If call forwarding occurs, the algorithm in ETSI TS 102 232-5 version 3.2.1 yields another CIN.

However, unlike the conventional algorithm, the method further includes determining whether the second message is related to the first communication session by comparing pieces of the first information with pieces of the second information, at 240. For example, considering that first and second messages are SIP messages, if "To" and "From" fields are the same for all the first and second messages, then the second message may pertain to the same communication session as the first messages, and additional comparisons may be made. Otherwise, the second message pertains to a communication session other than the first messages and another CIN is used to provide the required information to the agent.

If the "History-Info-Uri" or "Diversion-Uri" field in the second message (which is an INVITE or UPDATE SIP message) is the same as the "To" field of the first SIP messages, then the second message still may pertain to the same communication session as the first messages, and further comparisons may be made. Again otherwise, the second message pertains to a communication session other than the first messages, and therefore another CIN is used to provide the required information to the agent.

Furthermore, the "Request-Uri" field in the second message being different from the "To" field of the first messages indicates that call forwarding has occurred and, in view of the previously-described comparison, the same CIN as for the first messages is maintained.

The above-described sequence of comparisons (which may be called checks, tests or inquiries) is merely an illustration and not intended to be limiting. More, fewer or different inquiries may be pertinent to determine whether the second message is related to the same communication session as the first messages.

The method finally includes, at 250, sending the first CIN and the required information extracted from the second message to the agent, if determined that the second message is related to the first communication session.

Figure 3:
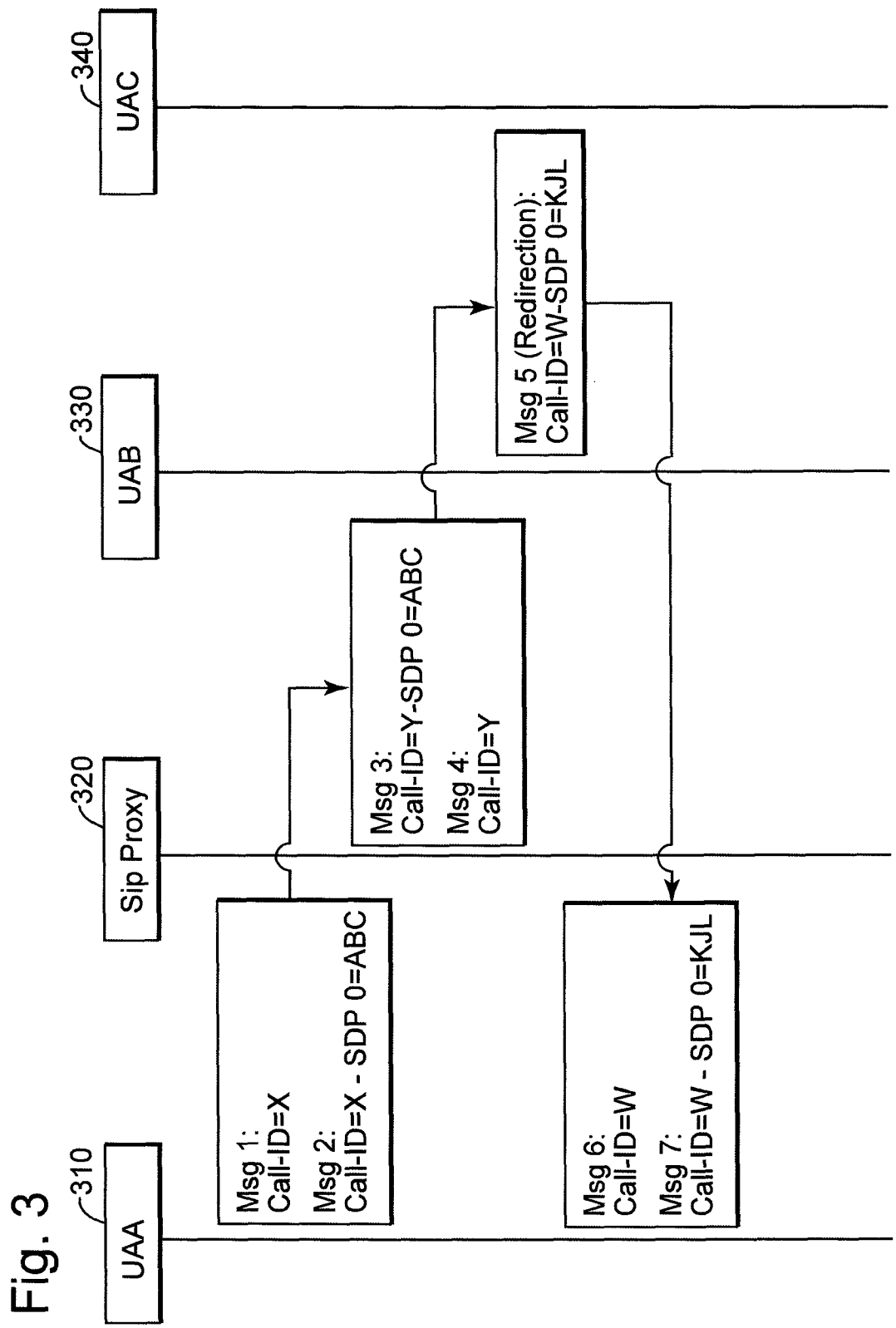
FIG. 3 illustrates manner of operation of a conventional algorithm.

FIG. 3 illustrates the manner of operation of the algorithm in ETSI TS 102 232-5 version 3.2.1 which focuses only on Call-ID and SDP_O fields of the SIP messages. An initial call leg from UA A 310 to UA B 330 via Sip Proxy 320 is shifted from UA B 330 to UA C 340 starting with message 5. This conventional algorithm cannot identify that message 5 is related to messages 1-4.

Figure 4:
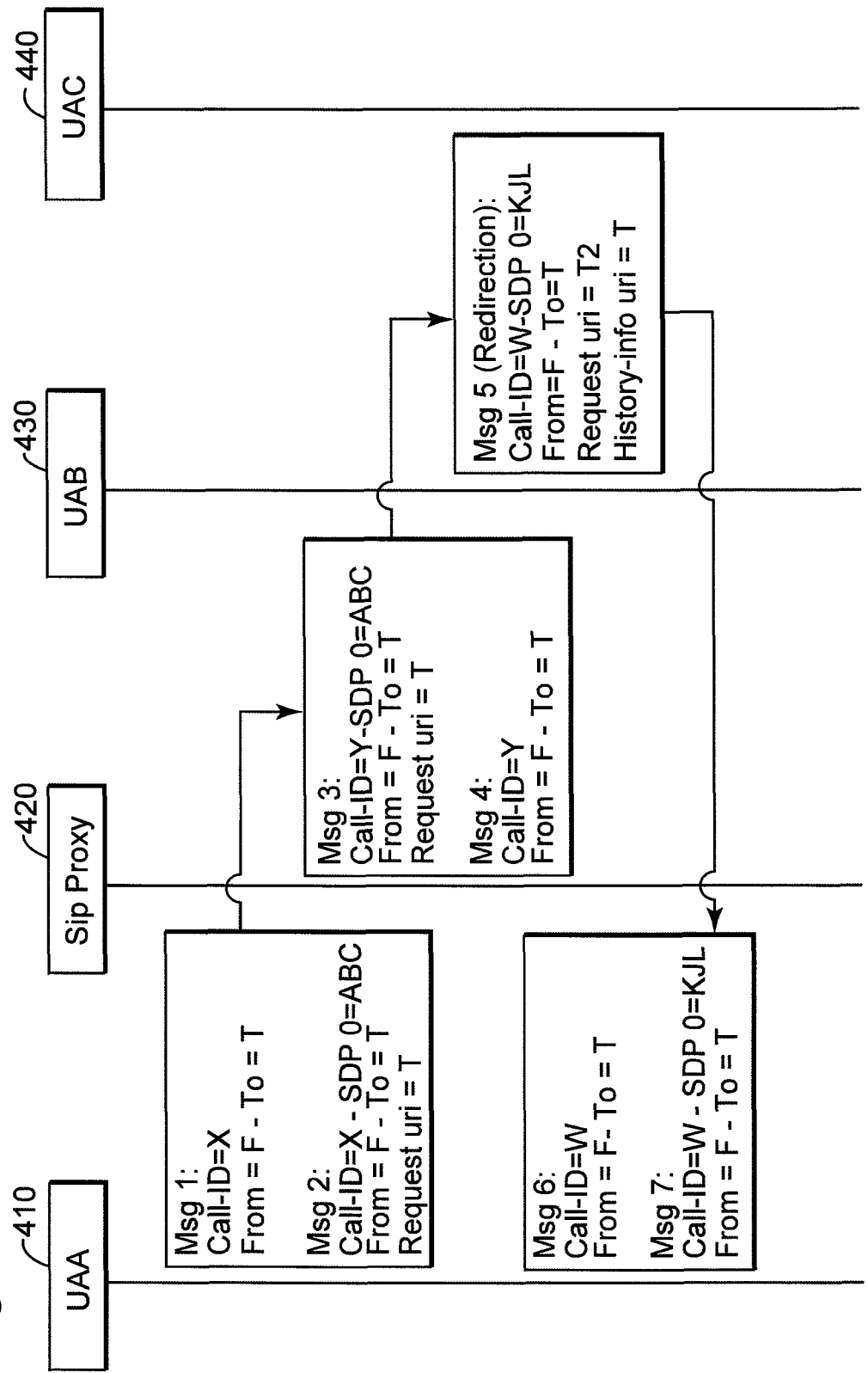
FIG. 4 illustrates manner of operation of a method according to an embodiment.

In contrast, FIG. 4 illustrates the manner of operation of a method according to an embodiment for the same situation, with an initial call leg from UA A 410 to UA B 430 via Sip Proxy 420 shifted from UA B 430 to UA C 440 starting with message 5. Based on (A) the "From" and "To" fields of message 5 being "F" and "T" respectively, as in the case of messages 1-4, (B) the "Request-uri" field of message 5 being different (i.e., "T2") from the "To" field (i.e., "T") of messages 1-4 and the "History-info-uri" field being "T", i.e., the same as the "To" field in messages 1-4, arrangement 101 is able to determine that message 5 pertains to the same communication session as messages 1-4. Messages 6 and 7 do pertain to the same communication session as message 5 as it can be established even using the conventional algorithm based in "Call-ID" and "SDP O" fields.

The required information includes at least IRI, but may also include CC. As defined in ETSI TS 102 232-1 Version 3.6.1, IRI is a collection of information or data associated with telecommunication services involving the target identity, specifically communication-associated information or data (including unsuccessful communication attempts), service-associated information or data (e.g., service profile management by subscriber) and location information. CC is all information other than IRI exchanges between two or more users of a telecommunication session.

Figure 5:
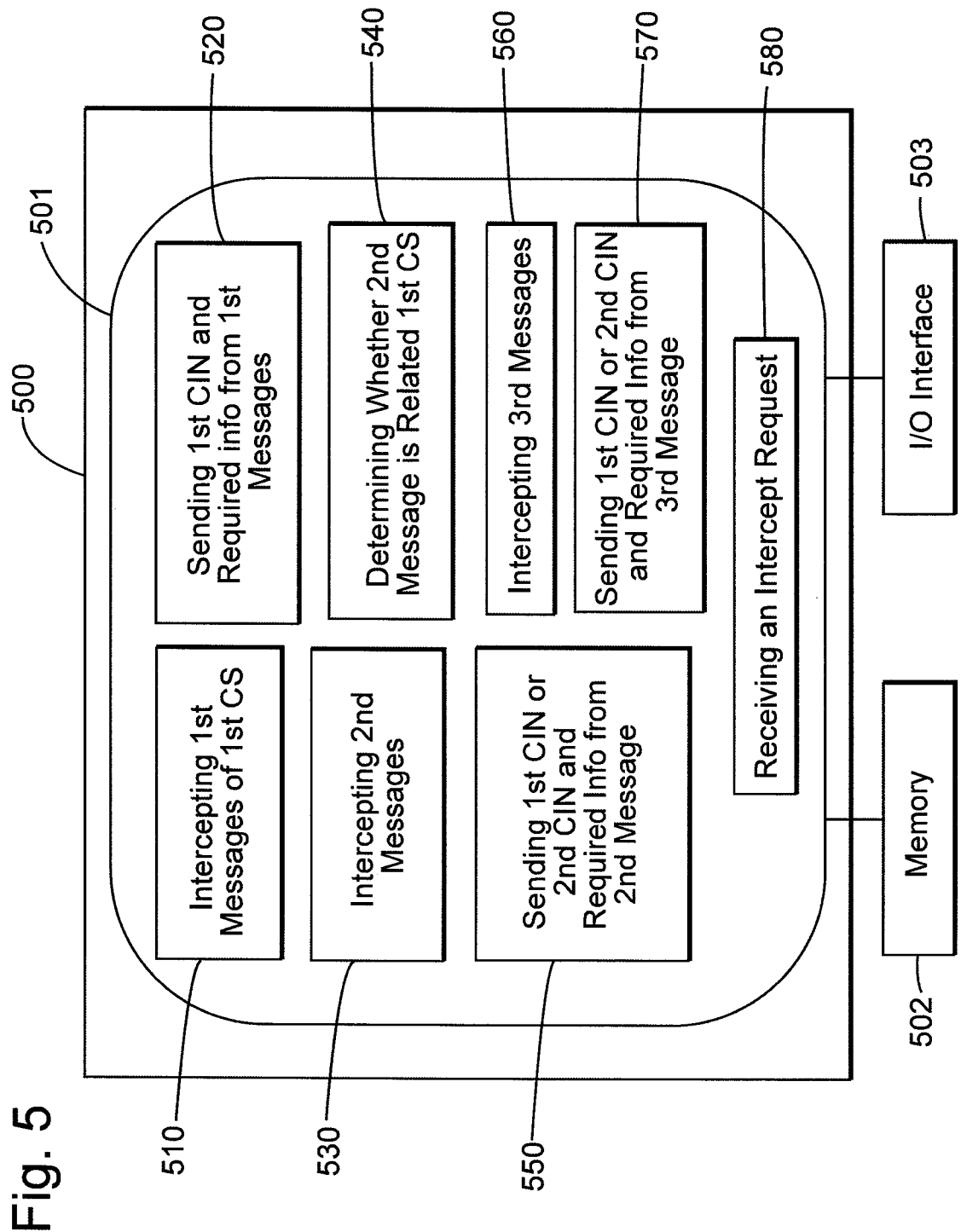
FIG. 5 is a block diagram of a node according to an embodiment.

A node 500 configured to perform the above-described functionality may have the structure illustrated in FIG. 5. Node 500 includes a data processing unit 501 having at least one processor (not shown) and connected to a memory 502 (i.e., a non-transitory computer-readable medium configured to store executable codes and data), and an I/O interface 503 configured to enable receiving packets such as signaling messages related to a communication session employing the target.

Node 500 includes a first module 510 configured to intercept first messages carrying first information which indicates that the first messages are related to a first communication session engaging the target, a second module 520 configured to send a first CIN and the required information extracted from the first messages to an agent, a third module 530 configured to intercept a second message transmitted after the first messages and carrying second information which differs partially from first information, a fourth module 540 configured to determine whether the second message is related to the first communication session by comparing pieces of the first information with pieces of the second information, and a fifth module 550 configured to send the first CIN and the required information extracted from the second message to the agent, if the fourth module determines that the second message is related to the first communication session.

The fifth module may be further configured to send a second CIN, which is different from the first CIN, and the required information extracted from the second message to the agent, if the fourth module determines that the second message is not related to the first communication session.

Node 500 also includes the following optional modules: a sixth module 560 configured to intercept third messages transmitted after the second message and carrying the second information, and a seventh 570 module configured (A) to send the first CIN and the required information extracted from the third messages to the agent, if the fourth module has determined that the second message is related to the first communication session, and (B) to send a second CIN, which is different from the first CIN, and the required information extracted from the third messages to the agent, if the fourth module has determined that the second message is not related to the first communication session.

Node 500 also includes the optional request-receiving module 580 configured to receive an intercept request identifying the target, a type of the required information, a period for interception, and one or more delivery addresses of the agent to which the required information is to be delivered.

Memory 502 may be configured to store executable codes, which, when executed by the data processing unit 501, makes it perform a method like the method in FIG. 2.

The disclosed embodiments describe methods and devices for providing required information related to a target to an agent using the same CIN during a communication session, in spite of call forwarding occurring during the session. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software or firmware tangibly embodied in a computer-readable storage medium for execution by a specifically programmed computer or processor.

What is claimed is:

1. A method performed by a network operator that sends, to an agent, required information related to a target that communicates via a communication network managed by the network operator, the method comprising:

intercepting first messages of a first call carrying first information which indicates that the first messages of the first call are related to a first communication session engaging the target;

sending a first communication identity number, CIN, and the required information extracted from the first messages of the first call, to the agent, wherein the first CIN uniquely identifies the first communication session; then intercepting a second message of a forwarded call transmitted after the first messages of the first call and carrying second information, which partially differs from the first information and indicates engaging the same target;

determining whether the second message of the forwarded call is related to the first communication session, by comparing pieces of the first information with pieces of the second information;
sending the same first CIN and the required information extracted from the second message of the forwarded call to the agent, if determined that the second message of the forwarded call is related to the same first communication session; and
sending a second CIN, which is different from the first CIN, and the required information extracted from the second message of the forwarded call to the agent, if determined that the second message of the forwarded call is not related to the first communication session, wherein the second CIN uniquely identifies a second communication session, which is different from the first communication session.

2. The method of claim 1, further comprising:
intercepting third messages of another call transmitted after the second message of the forwarded call and carrying the second information; and
sending the first CIN and the required information extracted from the third messages of the another call to the agent if determined that the second message of the forwarded call is related to the first communication session,
otherwise sending the second communication identity number and the required information extracted from the third messages of the another call to the agent.

3. The method of claim 1, wherein the first information and the second information indicate same call endpoints, one of which is the target.

4. The method of claim 3, wherein the first information includes a first route-related information, and the second information includes a second route-related information and a previous route-related information, and
if the second route-related information is different from the first route-related information, but the previous route-related information is the same as the first route-related information, then the second message of the forwarded call is related to the first communication session.

5. The method of claim 1, wherein the required information includes at least intercept related information, IRI.

6. The method of claim 1, wherein the determining is performed by a data processing unit including a processor.

7. The method of claim 1, further comprising:
receiving an intercept request which identifies the target, a type of the required information, a period for interception, and one or more delivery addresses of the agent to which the required information is to be delivered.

8. The method of claim 1, wherein the first messages of the first call and the second message of the forwarded call are Session Initiation Protocol, SIP, messages.

9. The method of claim 1, wherein, when the second message of the forwarded call is related to the first communication session, the second information is different from the first information due to call forwarding.

10. An arrangement including a processor in a network operator configured to intercept messages transmitted to a target via a network managed by the network operator, the arrangement comprising:
a first module configured to intercept first messages of a first call carrying first information which indicates that the first messages of the first call are related to a first communication session engaging the target;
a second module configured to send a first communication identity number, CIN, and the required information extracted from the first messages of the first call, to an agent, wherein the first CIN uniquely identifies the first communication session;
a third module configured to intercept a second message of a forwarded call transmitted after the first messages of the first call and carrying second information which partially differs from the first information and indicates engaging the same target;
a fourth module configured to determine whether the second message of the forwarded call is related to the first communication session, by comparing pieces of the first information with pieces of the second information; and
a fifth module which is configured to send the same first CIN and the required information extracted from the second message of the forwarded call to the agent, if the fourth module determines that the second message of the forwarded call is related to the same first communication session,
wherein the fifth module is further configured to send a second CIN, which is different from the first CIN, and the required information extracted from the second message of the forwarded call to the agent, if the fourth module determines that the second message of the forwarded call is not related to the first communication session, wherein the second CIN uniquely identifies a second communication session, which is different from the first communication session.

11. The arrangement of claim 10, further comprising:
a sixth module configured to intercept third messages of another call transmitted after the second message of the forwarded call and carrying the second information; and
a seventh module configured
to send the first CIN and the required information extracted from the third messages of the another call to the agent, if the fourth module has determined that the second message of the forwarded call is related to the first communication session, and
to send a second CIN, which is different from the first CIN, and the required information extracted from the third messages of the another call to the agent, if the fourth module has determined that the second message of the forwarded call is not related to the first communication session.

12. The arrangement of claim 10, wherein
the first information and the second information indicate same call endpoints, one of which is the target,
the first information includes a first route-related information, and the second information includes a second route-related information and a previous route-related information,
if the second route-related information is different from the first route-related information, but the previous route-related information is the same as the first route-related information, then the fourth module determines that the second message of the forwarded call is related to the first communication session.

13. The arrangement of claim 10, wherein the required information includes at least intercept related information, IRI.

14. The arrangement of claim 10, further comprising:
a request receiving module configured to receive an intercept request identifying the target, a type of the required information, a period for interception, and one or more delivery addresses of the agent to which the required information is to be delivered.

15. The arrangement of claim 10, wherein the first messages of the first call and the second message of the forwarded call are Session Initiation Protocol, SIP, messages.

16. A non-transitory computer-readable medium configured to store executable codes, which, when executed by a computer in a network operator that sends, to an agent, required information related to a target that communicates via a communication network managed by the network operator, makes the computer perform a method comprising:
    intercepting first messages of a first call carrying first information which indicates that the first messages of the first call are related to a first communication session engaging the target;
    sending a first communication identity number, CIN, and the required information extracted from the first messages of the first call, to the agent, where the first CIN uniquely identifies the first communication session; then
    intercepting a second message of a forwarded call transmitted after the first messages of the first call and carrying second information, which partially differs from the first information and indicates engaging the same target;
    determining whether the second message of the forwarded call is related to the first communication session, by comparing pieces of the first information with pieces of the second information; and
    if determined that the second message of the forwarded call is related to the same first communication session, sending the same first CIN and the required information extracted from the second message of the forwarded call to the agent,
    otherwise sending a second CIN, which is different from the first CIN, and the required information extracted from the second message of the forwarded call to the agent, wherein the second CIN uniquely identifies a second communication session, which is different from the first communication session.

17. The non-transitory computer-readable medium of claim 16, wherein the method further comprises:
    intercepting third messages of another call transmitted after the second message of the forwarded call and carrying the second information; and
    sending the first CIN and the required information extracted from the third messages of the another call to the agent if determined that the second message of the forwarded call is related to the first communication session,
    otherwise sending the second communication identity number and the required information extracted from the third messages of the another call to the agent.

18. The non-transitory computer-readable medium of claim 16, wherein
    the first information and the second information indicate same message source and message destination, one of the message source and the message destination being the target,
    the first information includes a first route-related information, and the second information includes a second route-related information and a previous route-related information, and
    if the second route-related information is different from the first route-related information, but the previous route-related information is the same as the first route-related information, then the second message of the forwarded call is related to the first communication session.

* * * * *